United States Patent
Kohn et al.

(10) Patent No.: US 7,755,329 B2
(45) Date of Patent: Jul. 13, 2010

(54) BATTERY CHARGING TIME OPTIMIZATION SYSTEM BASED ON BATTERY TEMPERATURE, COOLING SYSTEM POWER DEMAND, AND AVAILABILITY OF SURPLUS EXTERNAL POWER

(75) Inventors: Scott Ira Kohn, Redwood City, CA (US); Ernest Matthew Villanueva, San Mateo, CA (US)

(73) Assignee: Telsa Motors, Inc., Palo Alto, CA (US)

( * ) Notice: Subject to any disclaimer, the term of this patent is extended or adjusted under 35 U.S.C. 154(b) by 0 days.

(21) Appl. No.: 12/590,414

(22) Filed: Nov. 5, 2009

(65) Prior Publication Data

US 2010/0072954 A1  Mar. 25, 2010

Related U.S. Application Data

(63) Continuation of application No. 12/612,770, filed on Nov. 5, 2009.

(51) Int. Cl.
*H02J 7/04* (2006.01)
(52) U.S. Cl. .................... 320/150; 320/152; 320/153; 320/DIG. 11
(58) Field of Classification Search ............... 320/150, 320/152, 153, DIG. 11
See application file for complete search history.

(56) References Cited

U.S. PATENT DOCUMENTS

| | | | | | |
|---|---|---|---|---|---|
| 4,229,687 | A | * | 10/1980 | Newman | 320/112 |
| 5,055,656 | A | * | 10/1991 | Farah et al. | 219/209 |
| 5,583,417 | A | * | 12/1996 | Yuen | 320/160 |
| 6,188,202 | B1 | * | 2/2001 | Yagi et al. | 320/150 |
| 6,204,639 | B1 | * | 3/2001 | Takano et al. | 320/150 |
| 6,949,914 | B2 | * | 9/2005 | Aradachi et al. | 320/150 |
| 7,622,897 | B2 | * | 11/2009 | Eberhard et al. | 320/150 |

\* cited by examiner

*Primary Examiner*—Edward Tso
*Assistant Examiner*—Manuel Hernandez
(74) *Attorney, Agent, or Firm*—Patent Law Office of David G. Beck

(57) ABSTRACT

A system for optimizing battery pack charging is provided. In this system, during charging the coupling of auxiliary systems (e.g., battery cooling systems) to the external power source are delayed so that the battery pack charge rate may be optimized, limited only by the available power. Once surplus power is available, for example as the requirements of the charging system decrease, the auxiliary system or systems may be coupled to the external power source without degrading the performance of the charging system.

15 Claims, 18 Drawing Sheets

BATTERY CHARGING TIME OPTIMIZATION SYSTEM BASED ON BATTERY TEMPERATURE, COOLING SYSTEM POWER DEMAND, AND AVAILABILITY OF SURPLUS EXTERNAL POWER

CROSS-REFERENCES TO RELATED APPLICATIONS

This application is a continuation of U.S. patent application Ser. No. 12/612,770, filed Nov. 5, 2009, the disclosure of which is incorporated herein by reference for any and all purposes.

FIELD OF THE INVENTION

The present invention relates generally to batteries and, more particularly, to a method and apparatus for optimizing the charging time for a battery.

BACKGROUND OF THE INVENTION

Electric vehicles present a growing application for rechargeable batteries, and in particular for large battery packs. Such an application, however, presents a number of engineering challenges to the power system designer, primarily due to the need to balance the expectations of the consumer with the system requirements and the constraints placed on the system by the batteries within the battery pack. Consumer expectations include those associated with the vehicle as a whole, e.g., vehicle range, performance and reliability, and those that are specific to the vehicle's battery system, e.g., battery pack lifetime and replacement cost, and the time, cost and convenience associated with charging the vehicle. System requirements include power output, battery pack weight and reliability. Battery constraints include those associated with charging, operational, and storage temperatures; charge rates; the level of allowed/preferred charging (i.e., 75% of full charge, full charge, over-charged, etc.); and the level of discharge allowed before charging.

To address some of the issues associated with batteries, sophisticated charging algorithms may be employed. For example, co-pending U.S. patent application Ser. No. 12/322,217 discloses a system for controlling the charging system of an electric vehicle, more specifically the charging level, based on a number of parameters. Disclosed parameters include expected travel distance, road conditions, weather conditions, desired battery power safety margins and driving style. Co-pending U.S. patent application Ser. No. 11/779,837 discloses an alternate charging system controller that determines the optimal time to charge a battery pack based on charging cost, thus taking into account variations in the cost of electricity based on the time of day. Co-pending U.S. patent application Ser. Nos. 12/321,279 and 12/322,219 disclose an alternate charging system controller that determines the optimal cut-off voltage to be used during charging based on desired vehicle performance, driving range, vehicle usage and battery life.

While the prior art charging system controllers may take into account a variety of factors in determining optimal charge rates, charge levels, and charging times, these systems do not control the loads placed on the batteries during charging, for example those associated with auxiliary cooling systems. As a result, these system controllers do not effectively optimize battery pack charging time. Accordingly, what is needed is a system controller that can control both the charging system and any auxiliary loads placed on the batteries during charging, thus allowing the charge time to be optimized for a particular situation. The present invention provides such a system.

SUMMARY OF THE INVENTION

The present invention provides a system for optimizing battery pack charging. In this system, during charging the coupling of auxiliary systems (e.g., battery cooling systems) to the external power source are delayed so that the battery pack charge rate may be optimized, limited only by the available power. Once surplus power is available, for example as the requirements of the charging system decrease, the auxiliary system or systems may draw power from the external power source without degrading the performance of the charging system.

In at least one embodiment of the invention, a method for optimizing the charging cycle of a battery pack of an electric vehicle is provided, the method comprising the steps of electrically connecting the power control subsystem of the electric vehicle to an external power source, monitoring battery pack temperature and comparing the battery pack temperature to a first preset temperature. If the battery pack temperature is greater than the first preset temperature, the method comprises the steps of enabling operation of the battery pack cooling subsystem and charging the battery pack at a suboptimal charge rate which is limited by the maximum power reduced by the power drain due to the battery pack cooling system. If the battery pack temperature is less than the first preset temperature, the method comprises the steps of determining an optimal charge rate for the battery pack, charging the battery pack at the optimal charge rate, determining whether surplus power is available from the external power source, terminating operation of the battery pack cooling subsystem when the battery pack is charging at the optimal charge rate and no surplus power is available, and enabling operation of the battery pack cooling subsystem when the battery pack is charging at the optimal charge rate and surplus power is available. If the battery pack temperature is greater than the first preset temperature, the method may further comprise the steps of comparing the battery pack temperature to a second preset temperature, terminating operation of the battery pack cooling subsystem when the battery pack temperature is less than the second preset temperature, and adjusting the charge rate from the suboptimal charge rate to the optimal charge rate when operation of the battery pack cooling subsystem is terminated. The method may further comprise the steps of comparing the battery pack temperature to a second preset temperature and commencing operation of the battery pack cooling subsystem when the battery pack temperature is less than the first preset temperature and greater than the second preset temperature, and when the battery pack is charging at the optimal charge rate, and when surplus power is available. The method may further comprise the steps of monitoring a battery pack characteristic, comparing the battery pack characteristic to a target value for the battery pack characteristic, and terminating battery pack charging when the battery pack characteristic matches the target value. The method may further comprise the steps of monitoring the battery pack SOC, comparing the battery pack SOC to a target SOC, and terminating battery pack charging when the battery pack SOC is greater than the target SOC. The method may further comprise the steps of monitoring a battery pack characteristic, comparing the battery pack characteristic to a target value for the battery pack characteristic, terminating battery pack charging when the battery pack characteristic is greater than the target value and charging the battery pack at the optimal charge rate when the battery pack characteristic is less than the target value, comparing the battery pack temperature to a second preset temperature, enabling operation of the battery cooling subsystem when the battery pack temperature is greater than the second preset temperature and surplus power is available, and terminating operation of the battery cooling subsystem when the battery pack temperature is less than the second preset temperature. The method may further comprise the steps of monitoring the battery pack SOC, comparing the battery pack SOC to a target SOC, terminating battery pack charging when the battery pack SOC is greater than the target SOC and charging the battery pack at the optimal charge rate when the battery pack SOC is less than the target SOC, comparing the battery pack temperature to a second preset temperature, enabling operation of the battery cooling subsystem when the battery pack temperature is greater than the second preset temperature and surplus power is available, and terminating operation of the battery cooling subsystem when the battery pack temperature is less than the second preset temperature.

In at least one embodiment of the invention, a method for optimizing the charging cycle of a battery pack of an electric vehicle is provided, the method comprising the steps of electrically connecting the power control subsystem of the electric vehicle to an external power source, monitoring battery pack temperature and comparing the battery pack temperature to a first preset temperature that corresponds to a temperature of at least 50° C. If the battery pack temperature is greater than the first preset temperature, the method comprises the steps of enabling operation of the battery pack cooling subsystem, charging the battery pack at a suboptimal charge rate which is limited by the maximum power reduced by the power drain due to the battery pack cooling system, comparing the battery pack temperature to a second preset temperature that corresponds to a temperature between 40° C. and 50° C., and terminating operation of the battery pack cooling subsystem when the battery pack temperature is less than the second preset temperature. If the battery pack temperature is less than the first preset temperature, the method comprises the steps of determining an optimal charge rate for the battery pack, charging the battery pack at the optimal charge rate, determining whether surplus power is available from the external power source, terminating operation of the battery pack cooling subsystem when the battery pack is charging at the optimal charge rate and no surplus power is available, and enabling operation of the battery pack cooling subsystem when the battery pack is charging at the optimal charge rate and surplus power is available. The method may further comprise the steps of periodically comparing the battery pack temperature to a third preset temperature that corresponds to a temperature of less than 30° C., enabling operation of the battery pack cooling subsystem when the battery pack temperature is greater than the third preset temperature and the battery pack is charging at the optimal charge rate and surplus power is available, and terminating operation of the battery pack cooling subsystem when the battery pack temperature is less than the third preset temperature or when surplus power is unavailable. The method may further comprise the steps of monitoring the battery pack SOC, comparing the battery pack SOC to a target SOC, and terminating battery pack charging when the battery pack SOC is greater than the target SOC.

A further understanding of the nature and advantages of the present invention may be realized by reference to the remaining portions of the specification and the drawings.

DESCRIPTION OF THE SPECIFIC EMBODIMENTS

Figure 1:
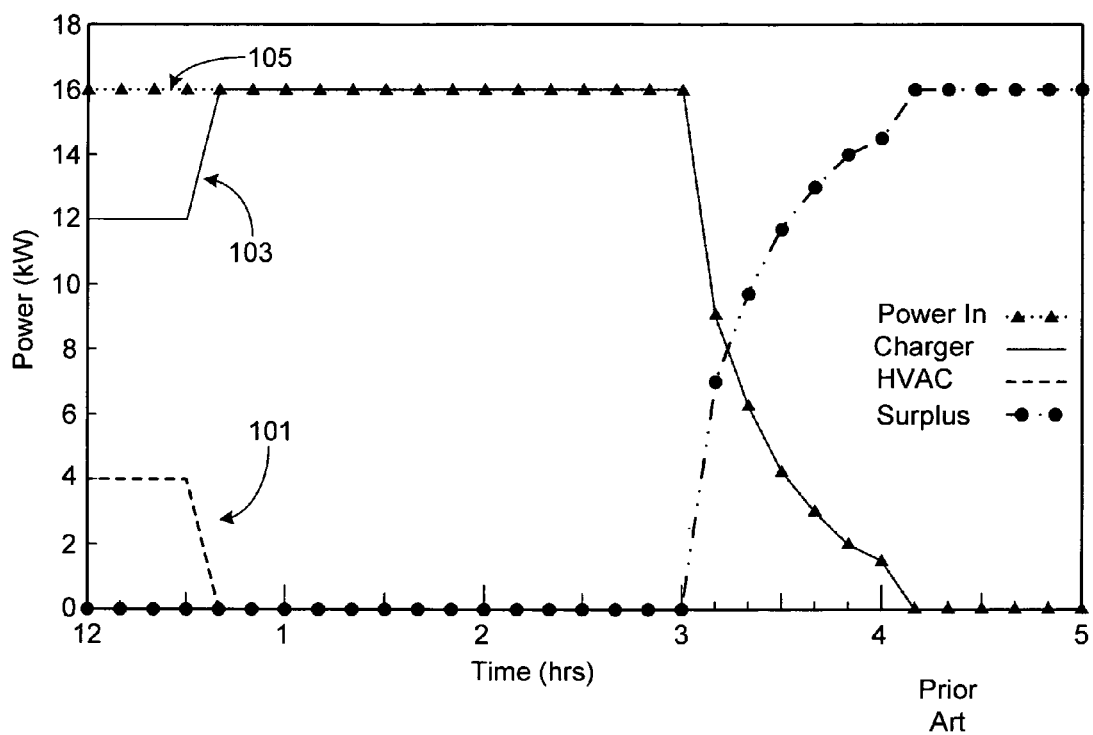
FIG. 1 graphically illustrates the effects of an auxiliary load on the charging cycle during the initial stages of charging with a limited power source using a conventional system.

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all electric vehicle, also referred to as an EV, a plug-in hybrid vehicle, also referred to as a PHEV, or a hybrid vehicle (HEV), a hybrid vehicle utilizing multiple propulsion sources one of which is an electric drive system. Additionally, the accompanying figures are only meant to illustrate, not limit, the scope of the invention.

In a system employing a large battery pack, such as an electric vehicle, in addition to the primary battery load, e.g., the electric motor and associated drive train components, there are a variety of auxiliary systems that also place a load on the batteries. These auxiliary systems may be internal auxiliary systems, or they may be external systems that, when coupled to the primary system and enabled, place a load on the batteries. While most of these loads are used primarily during system operation, e.g., when the vehicle is being driven, some of the largest auxiliary loads such as the heating, ventilation and air conditioning (HVAC) system may be required to operate both then and when the system is in a stand-by mode, e.g., parked and charging. Many applications may even require multiple HVAC systems, thus providing independent temperature control over the passenger cabin, battery pack, drive train and electronics.

In a conventional electric vehicle system, the auxiliary systems may be configured to operate whenever a preset condition is met. For example, an electric vehicle's battery cooling system may be configured to maintain the batteries at a temperature below a preset value, regardless of whether the system is operating or in a stand-by mode. As a result, when the car is initially parked and coupled to a charging source, a portion of the power available from the charging source is allocated to the battery cooling system, assuming that the battery temperature is higher than the target value when the electric vehicle is first parked. Although this situation would not necessarily be problematic if the power available from the charging source was unlimited, in a typical system the available power is limited, for example by the charging circuitry, electrical cabling, and/or grid connection. As used herein, the term "maximum power" refers to the maximum power available to the system, e.g., electric vehicle, as limited by the on-board circuitry, cabling, and grid connection.

Figure 2:
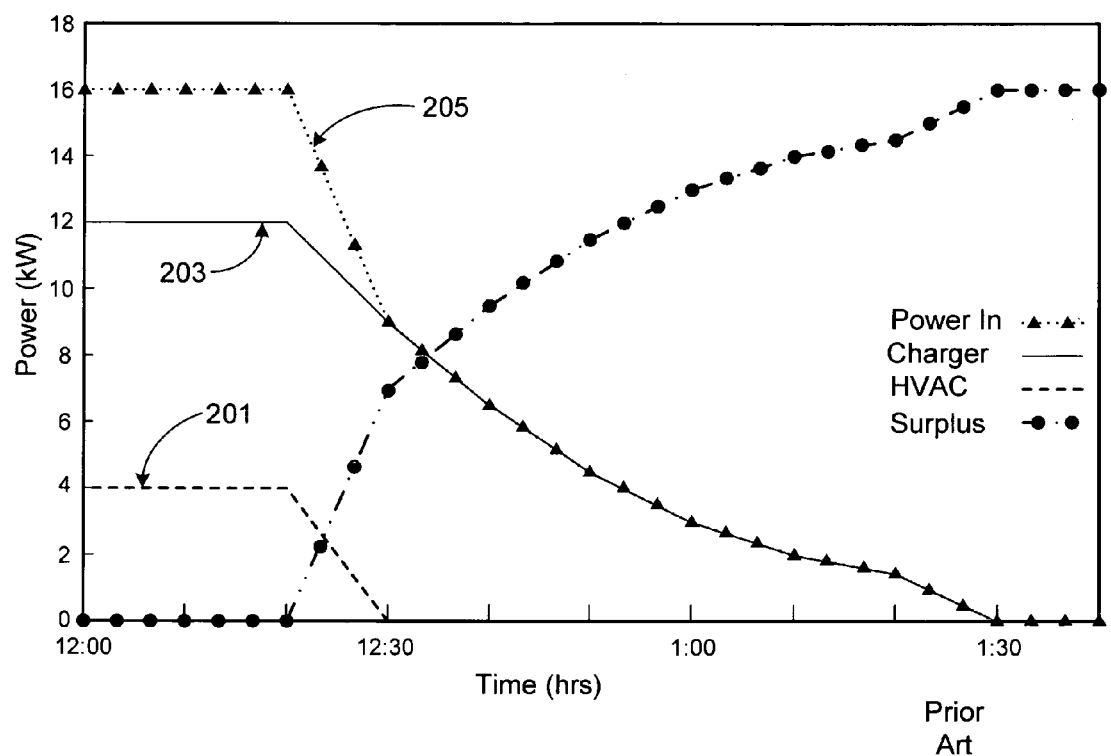
FIG. 2 graphically illustrates the effects of an auxiliary load on the charging cycle for an alternate system using a conventional system.

FIGS. 1 and 2 illustrate the effects of such an auxiliary load for a pair of exemplary systems in which the maximum power from the charging source is limited to 16 kW. As shown in FIG. 1, due to the operation of the battery cooling system (curve 101) when the vehicle is initially coupled to the charging source, the power available for battery charging (curve 103) is initially less than the maximum available power (curve 105). As the needs of the HVAC system taper off, the power available for battery charging increases until the maximum power available to the system is being used to charge the battery pack. Eventually the amount of power required for battery charging also tapers off. Similarly in the example shown in FIG. 2, operation of the battery cooling system (curve 201) prevents the optimization of battery charging time (curve 203) given the limited available power (curve 205).

It will be appreciated that, depending upon the type of system utilizing the rechargeable battery pack, and the type of auxiliary system in question, the system of the present invention may be configured in a variety of ways in order to accomplish the goal of the invention, i.e., optimizing charging time. Additionally, it should be understood that while a single auxiliary system is described and shown herein, the systems and methodology described hereafter may also be used to optimize battery charging in light of the load requirements of multiple auxiliary systems.

Figure 3:
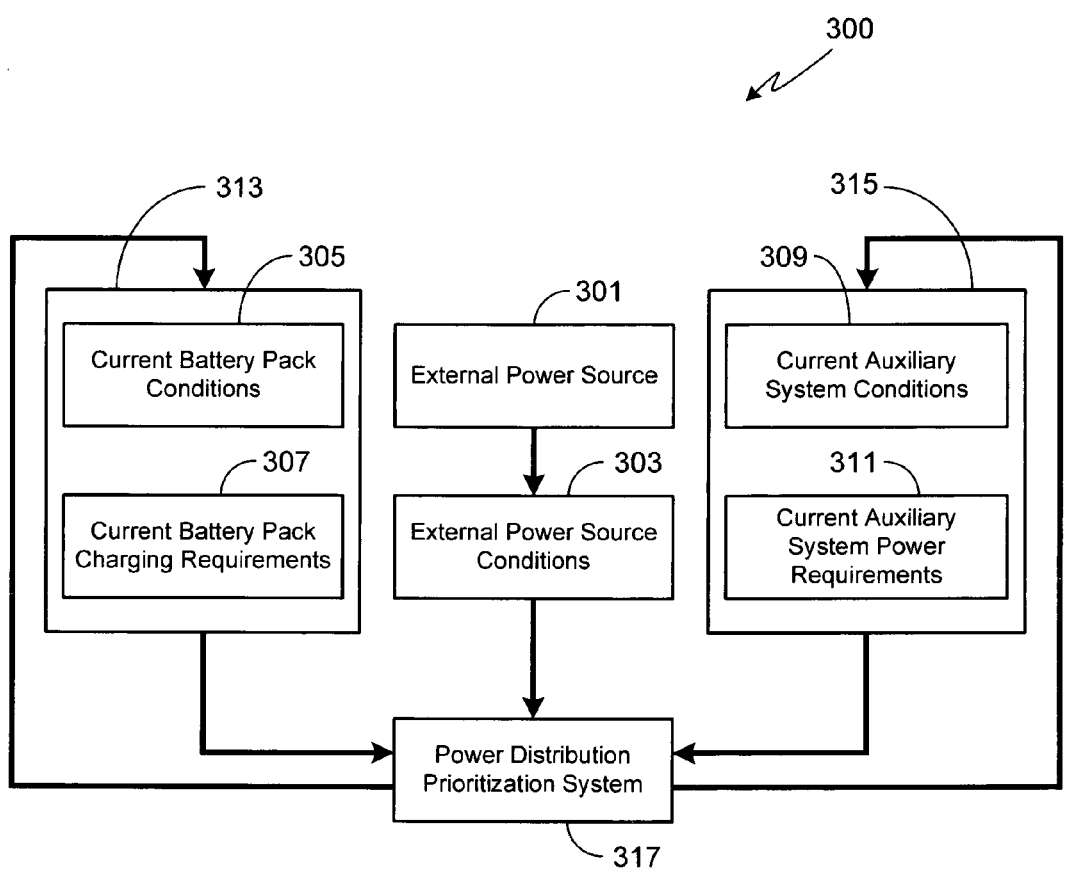
FIG. 3 illustrates the basic methodology of the present invention.

In general, and as illustrated in FIG. 3, when the system is coupled to an external power source 301, the parameters (e.g., voltage, current) associated with the power source are determined (303) in order to determine the maximum available power. As the maximum available power from power source 301 may vary over time, the parameters associated with the power source are continually updated (303). System 300 also monitors the conditions associated with the battery pack (305), conditions such as the current state-of-charge (SOC). Based on the battery pack conditions, system 300 determines the current battery pack charging requirements (307). These charging requirements are continually updated as the charging needs of the battery pack change. System 300 also monitors the conditions associated with the auxiliary load (309). For example, if the auxiliary load is a battery pack thermal management system, then battery pack temperature comprise at least one of the conditions monitored in step 309. Based on the conditions associated with the auxiliary system, auxiliary system power requirements are determined (311). Finally, the conditions and requirements of the battery pack (313) and of the auxiliary system (315) are provided to a power distribution prioritization system 317. System 317 prioritizes the delivery of power from the external power source to the battery pack charging system and to the auxiliary system, giving priority to battery pack charging. Preferably the power delivered to the battery pack charging system is based on achieving the optimal battery pack charge rate determined in step 307, while the power delivered to the auxiliary system is based on surplus power, where surplus power is defined as the power available from the external power source in excess of that required to achieve the optimal charge rate. System 317 further ensures that as the conditions and the requirements of the battery pack and the auxiliary system vary with time, so does the distribution of power from the external power source.

As previously noted, the present invention can be used with a variety of different systems that utilize a rechargeable battery pack. Accordingly, the inventor envisions that the present invention may be used with systems in which the load due to the auxiliary system(s) occurs in discrete steps, and in systems in which the load due to the auxiliary system(s) is continually variable. Exemplary embodiments based on both configurations are provided herein.

Figure 4:
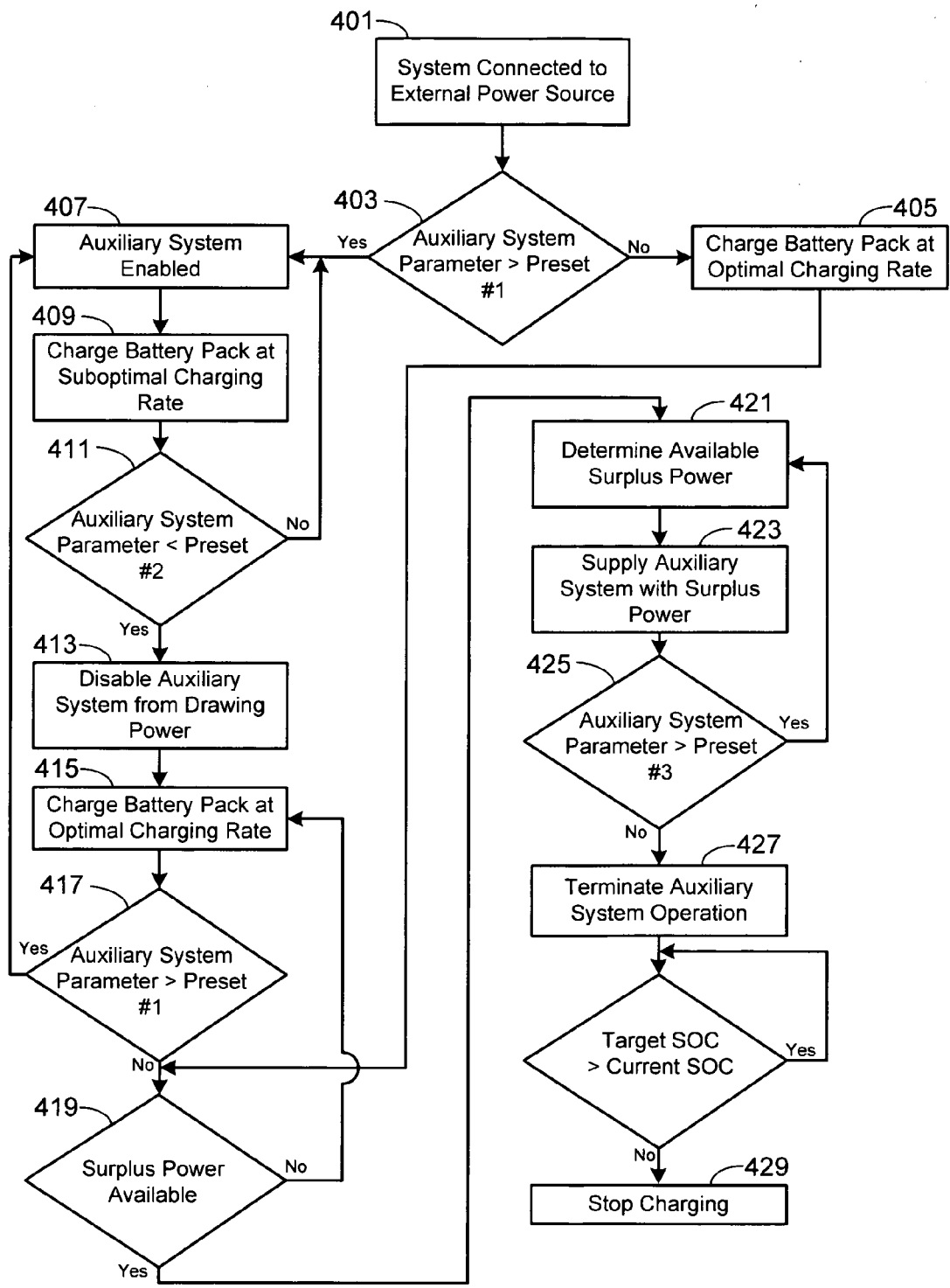
FIG. 4 illustrates the methodology of the invention as applied to an embodiment with a generic auxiliary load.

FIG. 4 illustrates a first embodiment of the invention. As shown, after the system is connected to an external power source for battery charging (step 401), a monitored parameter associated with the auxiliary system is compared to a first preset value (step 403) in order to determine whether or not the auxiliary system must be immediately coupled to the charging source. For example, if the auxiliary system is a battery pack heating or cooling system, i.e., a battery pack thermal management system, battery pack temperature is the parameter that must be checked in step 403 in order to determine if battery pre-conditioning is required, i.e., in order to bring the battery pack into an acceptable temperature range for charging. It will be appreciated that while the auxiliary system in the present example is a battery pack thermal management system, the invention can be used equally well with other auxiliary systems that place a load on the external source, thus potentially affecting the battery charge rate.

One outcome of step 403 is that the parameter associated with the auxiliary system is less than the first preset value, indicating in this example that the auxiliary system does not need to be immediately enabled. As a result, the battery pack may be charged at the optimal charge rate (step 405) as set by the charging controller, only limited by the maximum power that is available from the external power source. In contrast, if the outcome of step 403 is that the auxiliary system must immediately draw power from the charging source (step 407), then the battery pack will be charged at a suboptimal level (step 409), assuming that there is limited available power from the charging source and that the available power is insufficient to simultaneously provide power to the auxiliary system and charge the battery pack at the optimal rate.

If the power from the external power source is being used to provide power to the auxiliary system and charge the battery pack at a suboptimal rate, then the system controller periodically checks to see whether or not the parameter associated with the auxiliary system has fallen below a second preset value (step 411), thereby indicating that the auxiliary load may at least be temporarily disabled from drawing power from the power source. If it has not fallen below the second preset level, then the system continues to provide power to the auxiliary system while charging the battery pack at the suboptimal level. If it has fallen below the second preset level, then the auxiliary system is disabled from drawing power from the external power source (step 413) and battery pack charging is ramped up to the optimal charge rate (step 415). If at any point thereafter the parameter associated with the auxiliary system exceeds the first preset value, as determined in step 417, then the charging rate is reduced as necessary and the auxiliary system is once again allowed to draw power.

After charging is being performed at the optimal charge rate, then the system determines if the maximum power available to the system from the external power source exceeds that required by the charging system (step 419). If and when it does, then the amount of surplus power is determined (step 421) and supplied to the auxiliary system (step 423). This process continues until the system controller determines that the auxiliary system needs no further power, typically by comparing the auxiliary system parameter to a third preset (step 425). Once the auxiliary system requires no additional power, auxiliary system operation is terminated (step 427). Then, once the target state-of-charge (SOC) for the battery pack is reached, battery charging is terminated (step 429). As used herein, stopping or terminating charging refers to a complete reduction, i.e., to 0, to the power being transferred from the external power source to the battery pack. It will be appreciated that other battery pack characteristics may be used, rather than SOC, to determine whether or not battery charging is complete (e.g., a particular cell voltage during a constant voltage hold and current threshold).

Figure 5:
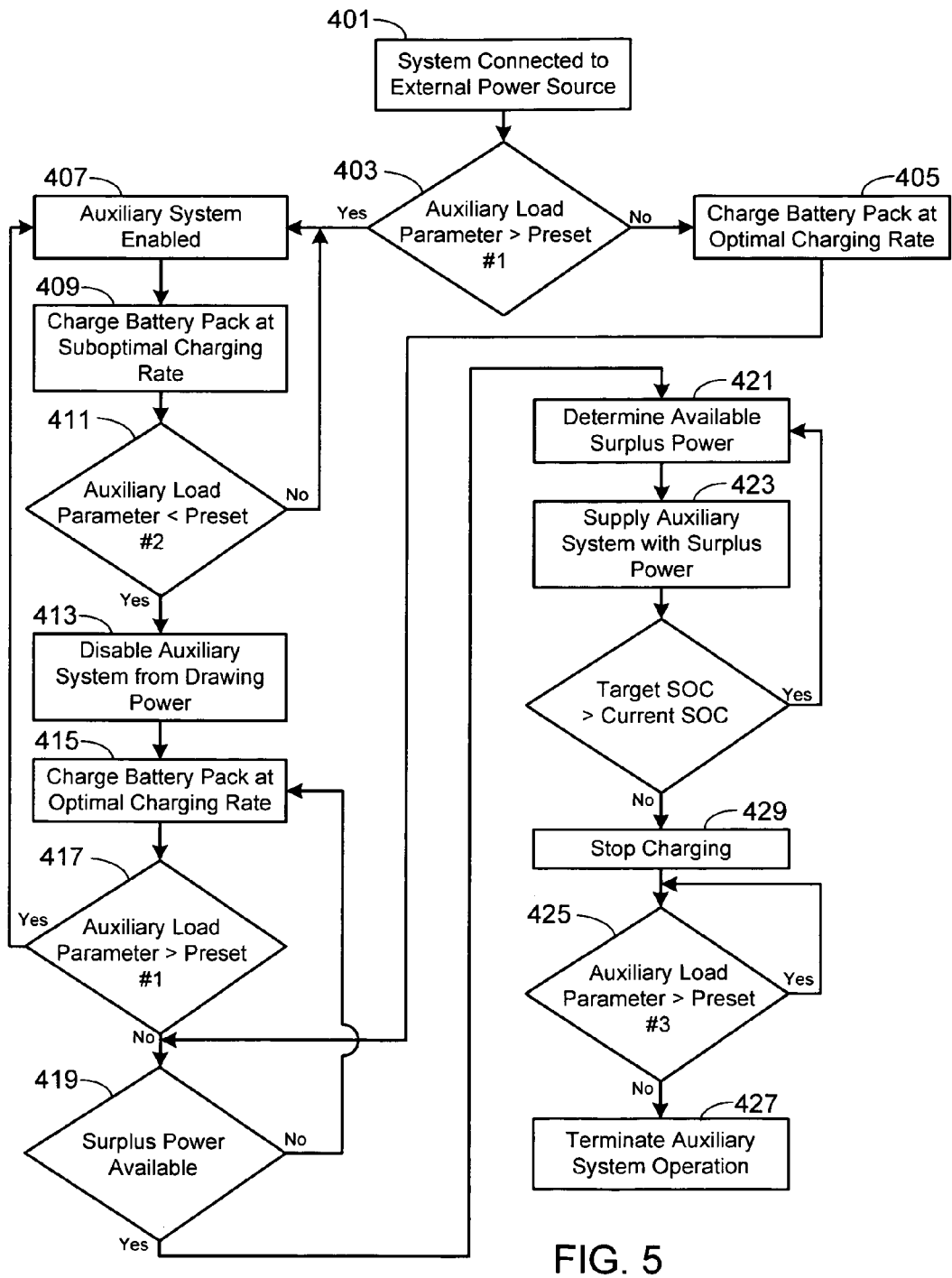
FIG. 5 illustrates a variation of the methodology shown in FIG. 4.

In the above process, it is assumed that the requirements of the auxiliary system will be met before the target SOC is reached. FIG. 5 illustrates an alternate embodiment in which battery pack charging is expected to conclude before the system determines that the auxiliary system no longer must receive power. Accordingly, once battery charging is terminated, all power from the external power source may be provided to the auxiliary system(s). Preferably if the auxiliary system continues to operate after charging is terminated, the required power is provided by the external power source, for example via the charging system, rather than from the battery pack.

Figure 6:
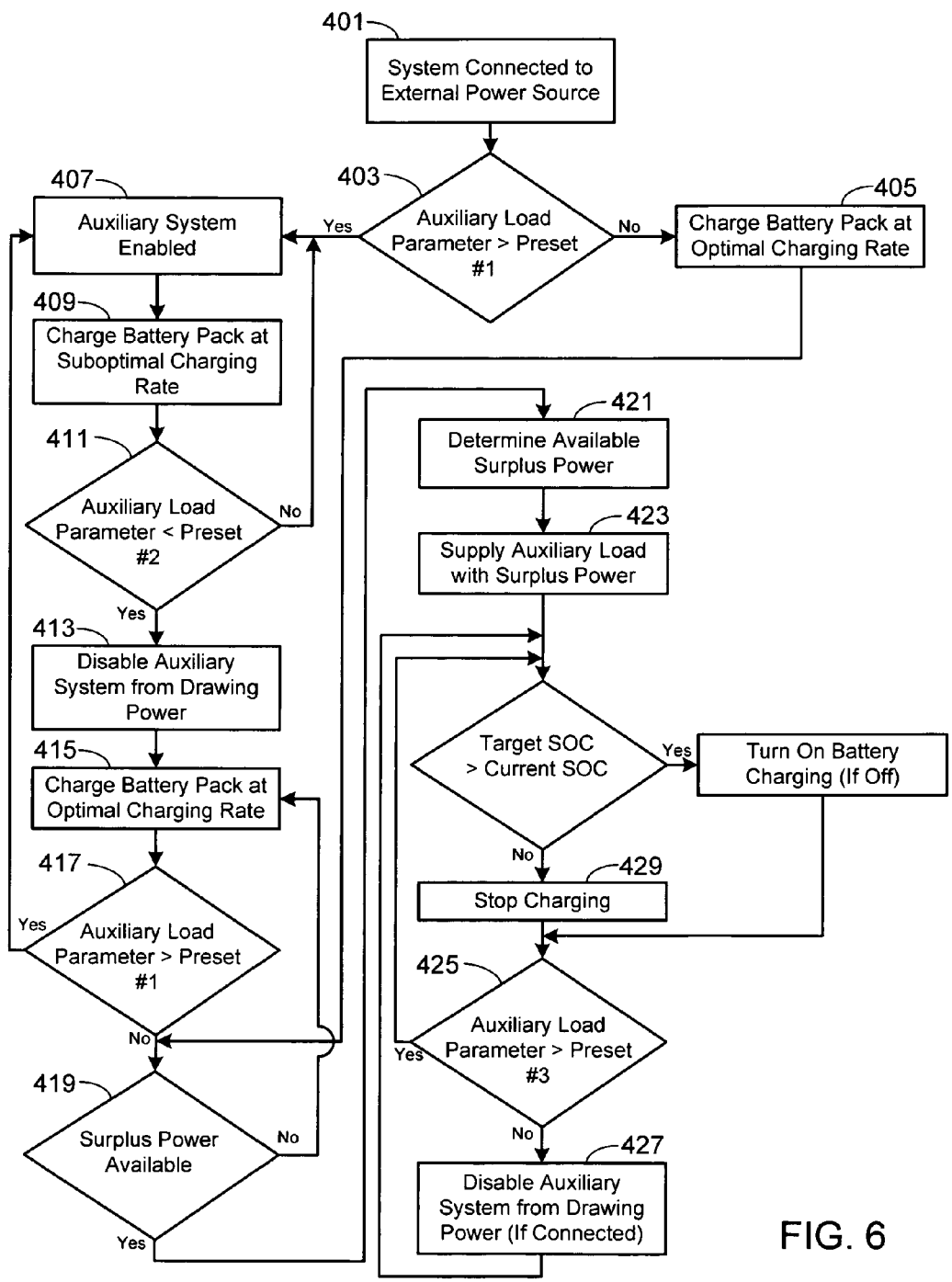
FIG. 6 illustrates another variation of the methodology shown in FIG. 4.

FIG. 6 illustrates another variation of the system shown in FIG. 4. In the illustrated system, both battery pack SOC and the auxiliary system parameter continue to be monitored after auxiliary system and battery charging are terminated. Accordingly, this approach allows the system controller to re-initiate charging and/or delivery of power to the auxiliary system at any time.

Figure 7:
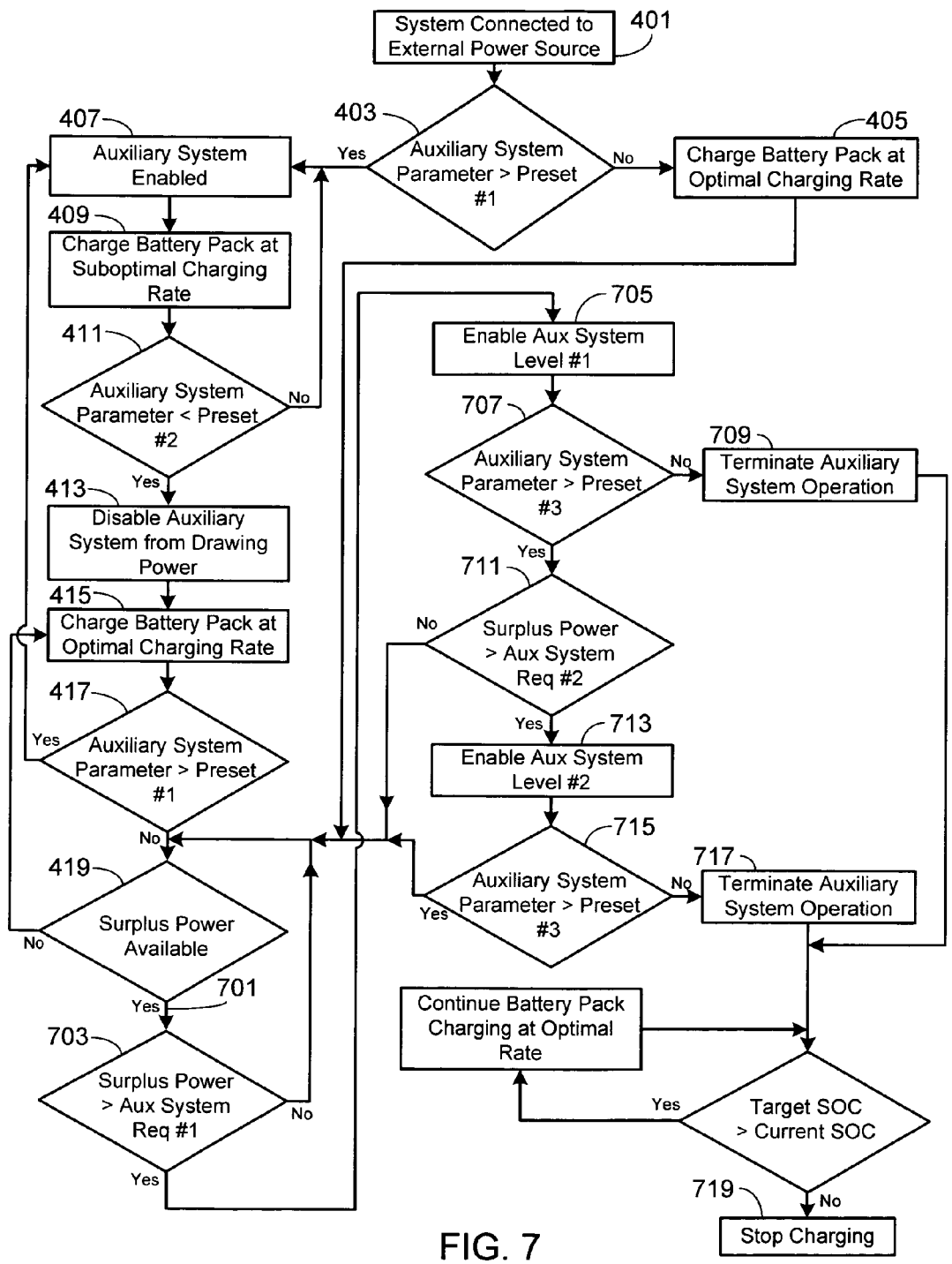
FIG. 7 illustrates another variation of the methodology shown in FIG. 4.

In the methodologies illustrated in FIGS. 4-6, once surplus power becomes available and auxiliary system operation is enabled, the auxiliary system is allowed to draw as much power as is available from the external power source, limited only by the amount of power required at a given point in time by the charging system for battery charging. Therefore as the needs of the battery, and thus the load placed on the external power source by the charging system, decrease, the amount of surplus power available to the auxiliary system will increase. Accordingly, in a process such as those illustrated and described above, the amount of power available to the auxiliary system will vary over time, thus making the system ideally suited for use with an auxiliary system in which the system's demands are continuously variable over time. For example, if the auxiliary system is a battery pack thermal management system, then the system can be designed to vary the load continuously by varying the operating point of a compressor, chiller, heater, coolant flow pump, fan or other continuously variable device. It should be understood, however, that any of the previously described processes may be configured to operate with an auxiliary load that varies in discrete steps (e.g., coolant flow pump on or off; coolant refrigeration system on or off; etc.). In such a system once surplus power becomes available, the amount of available power is compared to the discrete requirements of the auxiliary system. FIG. 7 illustrates such a method, based on the process described above relative to FIG. 4.

In the process illustrated in FIG. 7, once surplus power becomes available (step 701), the amount of available surplus power is compared to a first power requirement of the auxiliary system (step 703). If there is sufficient surplus power, then the first level of auxiliary system operation is enabled (step 705). If not, then monitoring of the surplus power level continues until sufficient surplus power becomes available. Next, the system controller compares the auxiliary system parameter to the third preset (step 707). If the system controller determines that the auxiliary system needs no further power, i.e., that the third preset has been reached, then auxiliary system operation is terminated (step 709). If the third preset has not been reached, then the system controller compares the amount of surplus power to the second power requirement of the auxiliary system (step 711). If there is sufficient surplus power, then both the first and second levels of auxiliary system operation are enabled (step 713). If not, then monitoring of the surplus power level continues. Once again, the system controller compares the auxiliary system parameter to the third preset (step 715). If the third preset has been reached, then auxiliary system operation is terminated (step 717); if not, then surplus power monitoring continues. Once the auxiliary system is disabled (step 709 or 717), then monitoring of the battery pack SOC continues until the target SOC is reached, after which battery charging is terminated (step 719).

It will be appreciated that in an embodiment using discrete levels of auxiliary system operation, as illustrated in FIG. 7, the system may have more or less discrete steps than shown. Additionally, and as in the prior embodiments, the pre-conditioning steps are not required, i.e., going directly from connecting the external power source (step 401) to charging the battery pack at the optimal charging rate (step 405). Lastly, the use of discrete levels of auxiliary system operation may also be used with the variations shown in FIGS. 5 and 6.

Figure 8:
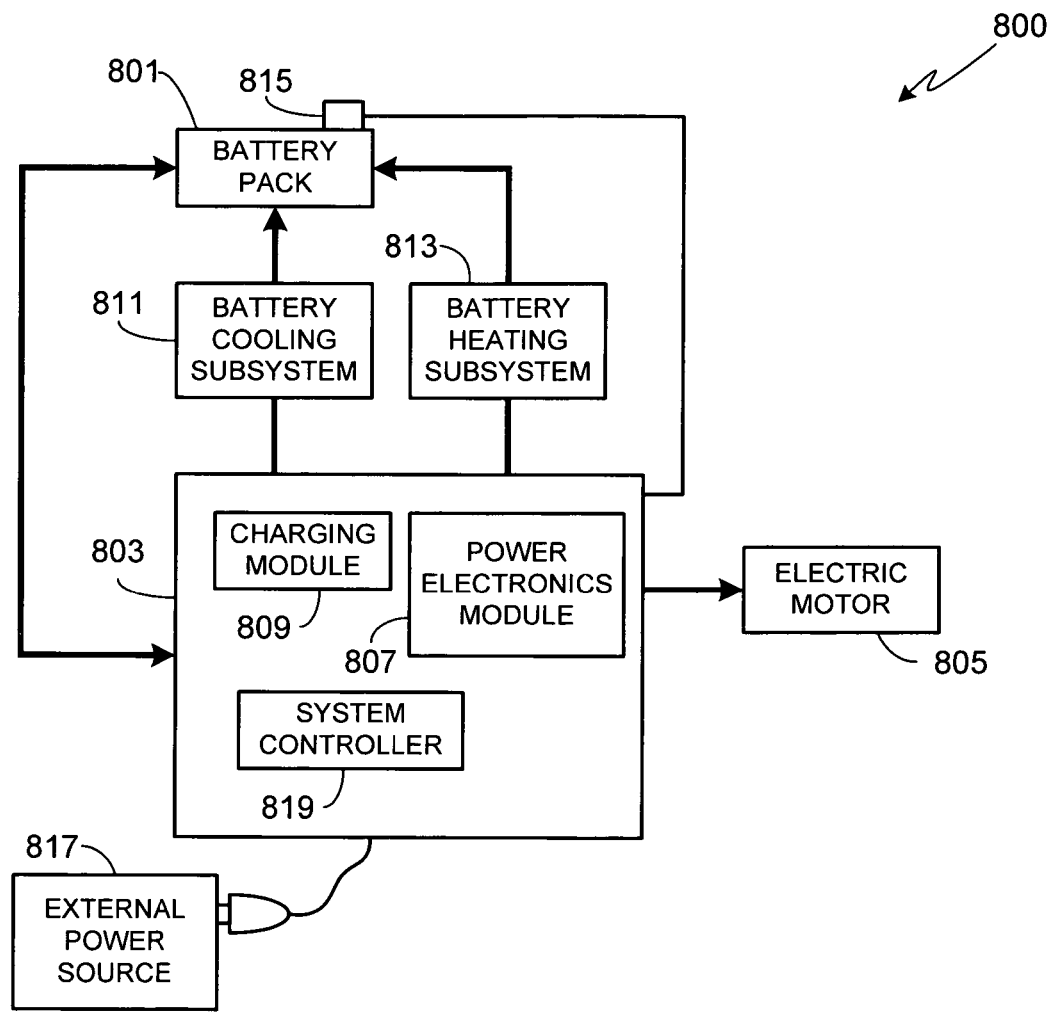
FIG. 8 illustrates a block diagram of the primary subsystems and components involved in a preferred embodiment of the invention.

FIG. 8 is a block diagram of the primary subsystems and components involved in a preferred embodiment of the invention for use in an electric vehicle, e.g., EV, PHEV, or HEV, or in other applications using a rechargeable battery power source and a battery cooling subsystem. It will be appreciated that other system configurations can be utilized while still retaining the functionality of the present invention. Additionally, it should be understood that one or more of the elements shown in FIG. 8 may be grouped together in a single device, and/or circuit board, and/or integrated circuit.

As shown, system 800 includes a rechargeable battery pack 801. Although battery 801 may be comprised of a single cell, preferably it is comprised of a plurality of electrically interconnected cells configured to achieve the desired voltage and capacity for the intended application. Coupled to battery pack 801 is a power control subsystem 803 that controls the power coupled from battery pack 801 to a vehicle propulsion motor 805, for example using a power electronics module (PEM) 807. Power electronics module 807 is used to insure that the power delivered to motor 805 has the desired voltage, current, waveform, etc. Thus, for example, power electronics module 807 preferably includes a DC to AC inverter. It will be appreciated that vehicle propulsion motor 805 may be comprised of a single electric motor, or multiple electric motors.

Power control subsystem 803 is further comprised of a charging controller 809 that controls the charging cycle, e.g., the charging rate, cut-off voltage, etc. Typically power control subsystem 803 also monitors the state-of-charge (SOC) of battery pack 801. Although charging controller 809 is preferably integrated within power control subsystem 803 as shown, in at least one alternate embodiment charging controller 809 is external to the power control subsystem 803. In such an embodiment, charging controller 809 may be internal or external to the vehicle. For example, the portion of the charging controller that converts external power to voltages and currents that are compatible with battery pack 801 may be external to the vehicle while a second portion of the charging controller that controls charging characteristics such as cut-off voltage, charging rate, etc. may be internal to the vehicle. Alternately, the entire charging controller can be external to the power control subsystem 803 and the vehicle.

Due to the demands placed on battery pack 801, and the preferred operating, charging and storage temperatures of battery pack 801, in a typical configuration a battery cooling subsystem 811 is coupled to the battery. In at least one embodiment, battery cooling subsystem 811 uses a liquid coolant to cool battery pack 801. In some embodiments, a battery heating subsystem 813 is also coupled to the battery pack. An exemplary battery temperature control system is described in detail in co-pending U.S. patent application Ser. No. 11/786,108, filed Apr. 11, 2007, the disclosure of which is incorporated herein for any and all purposes. In order to determine when to operate the cooling and/or heating subsystems, power control subsystem 803 monitors the temperature of battery pack 801 with a temperature sensor 815. Sensor 815 may use any of a variety of temperature sensing elements, e.g., thermocouples, thermistors, resistance temperature detectors (RTDs), etc. Although FIG. 8 only shows a single representative sensor 815, it should be understood that multiple sensors 815 may be used to give an average battery pack temperature, or to monitor for temperature extremes within the battery pack. Multiple sensors 815 are typically required to accurately monitor the temperature of a battery pack comprised of a large plurality of cells.

Battery pack 801 is configured to be plugged into, or otherwise connected to, an external power source 817 via charging controller 809. A municipal power grid is one example of an external power source 817. Charging controller 809 insures that the power from source 817 is converted to a form of power storable by battery pack 801. For example, charging controller 809 typically includes an AC to DC rectifier in order to convert power from the power source to that required by battery pack 801.

In accordance with the invention, a system controller 819 is included within system 800, either included within power control subsystem 803 as shown or separate from power control subsystem 803. System controller 819 may be a microprocessor, microcontroller, central processing unit (CPU) or similar device capable of monitoring and controlling various aspects of system 800 as described in detail below.

Figure 9A:
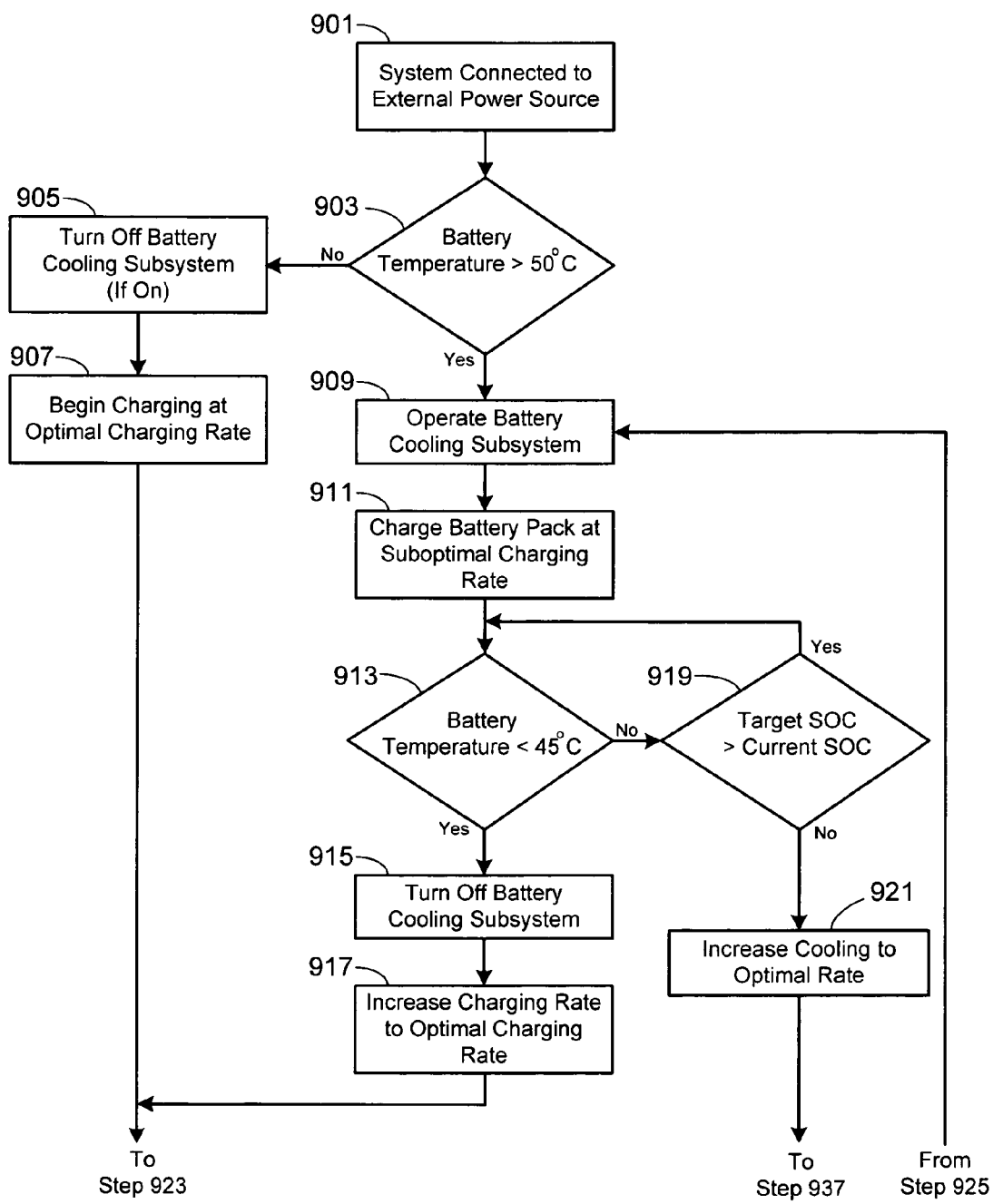
FIG. 9A illustrates the first portion of the methodology of the invention as applied to a preferred embodiment.
Figure 9B:
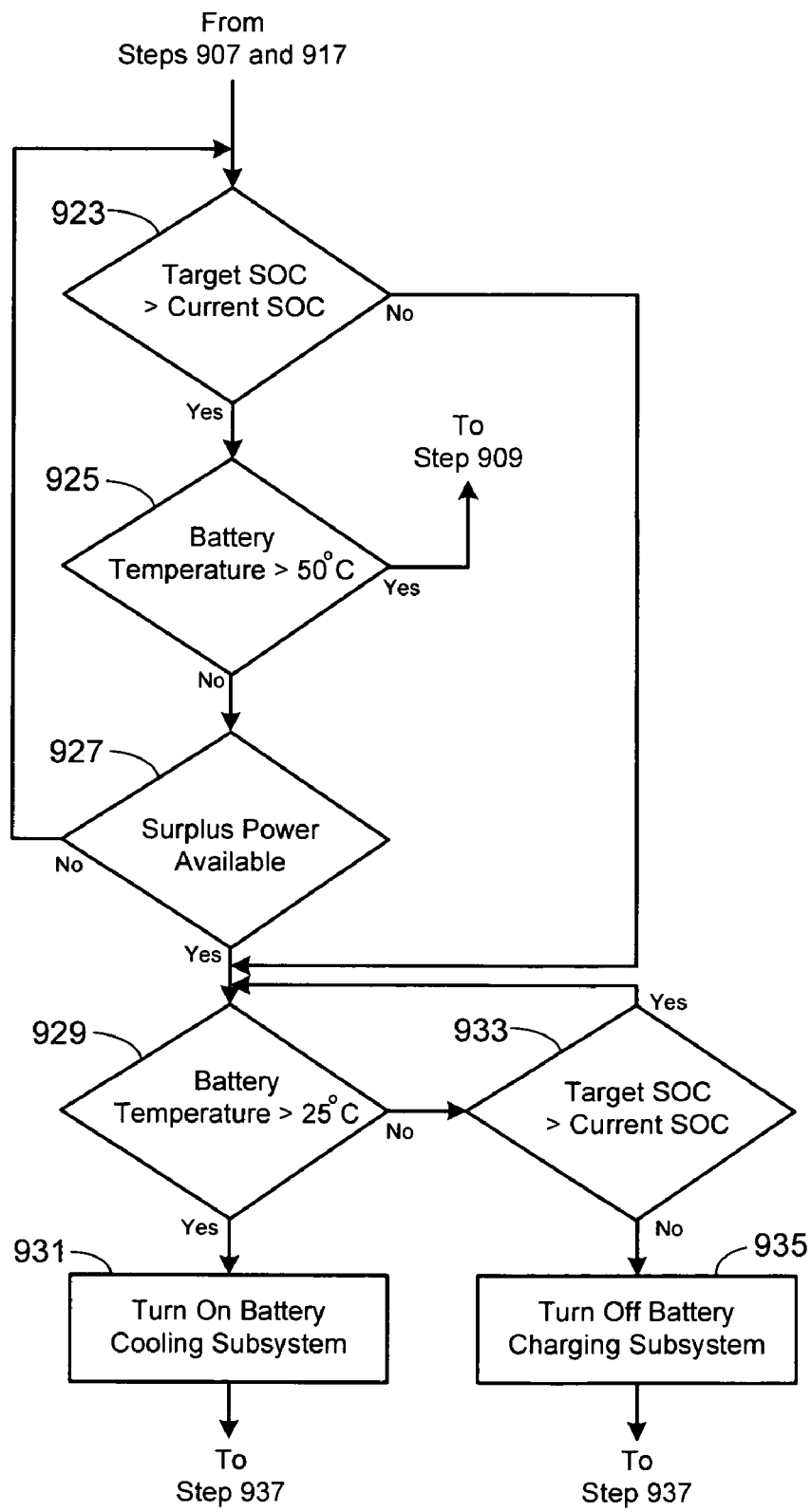
FIG. 9B illustrates the second portion of the methodology of FIG. 9A.
Figure 9C:
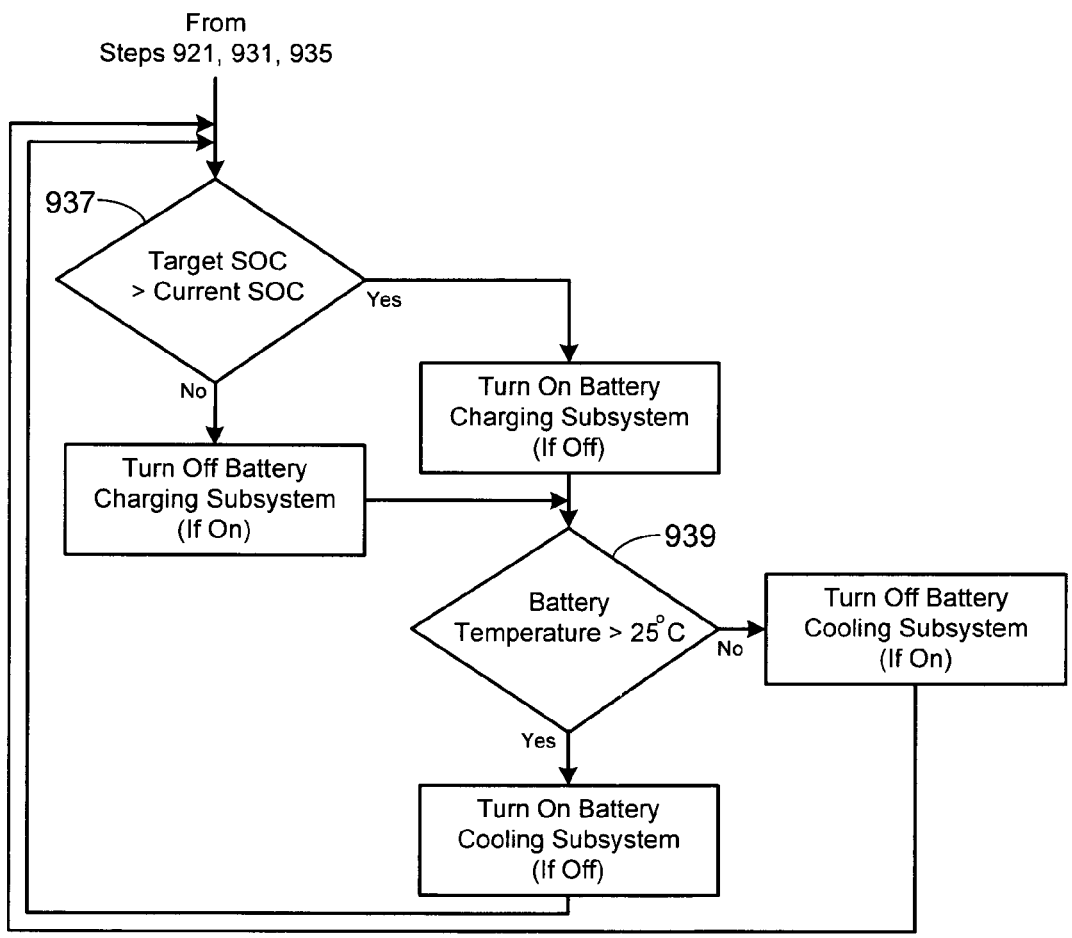
FIG. 9C illustrates the third portion of the methodology of FIGS. 9A and 9B.

FIGS. 9A-9C illustrate the methodology of a preferred embodiment of the invention, as implemented by system 800. The process is preferably initiated when system 800 is first electrically connected to external power source 817 (step 901) in order to charge the battery pack. Once connected, the system controller determines whether battery pack preconditioning is required by comparing the battery pack temperature to a first preset temperature, i.e., threshold requirement (step 903), the first preset temperature typically being a relatively high temperature. Although the first preset temperature shown in FIG. 9A is 50° C., it will be appreciated that other temperatures may be selected based on the specific application as well as the operating characteristics of the selected batteries. During the battery pack temperature comparing step, i.e., step 903, preferably the highest temperature monitored for battery pack 801 is used, thus ensuring that all of the cells within the battery pack remain below the preset temperature. Alternately, an average temperature may be used in this step.

If the monitored battery pack temperature is less than the first preset temperature, e.g., 50° C. in the illustrated embodiment, then the battery cooling subsystem is turned off (step 905) to reduce the load of this auxiliary system on the external power source and the charging system. Battery pack charging (step 907) is then initiated at the optimal charge rate, limited by the maximum power as determined by the charging circuitry, electrical cabling, and/or grid connection. If during step 903 it is determined that the monitored battery pack temperature is greater than the first preset temperature, then the battery cooling subsystem is turned on (step 909). If the system allows such flexibility, preferably the cooling subsystem is set to maximize electrical to thermal efficiency. Additionally, to the extent permitted by the external power source and the charging system (i.e., the maximum available power), battery pack charging is also initiated (step 911). Once the battery pack temperature falls below a second preset temperature, e.g., 45° C. in the illustrated embodiment, as determined in step 913, then the battery cooling subsystem is turned off (step 915) and battery pack charging is adjusted to the optimal charge rate (step 917). If the battery pack temperature is above the second preset temperature as determined in step 913, then the current SOC is compared to a desired SOC, also referred to as the target SOC (step 919). If the target SOC is greater than the present SOC, battery cooling and battery charging at a reduced rate continues. If the monitored battery SOC is equal to or greater than the target SOC, battery cooling continues. If the system permits, battery cooling may be increased, for example by activating a refrigeration subsystem thermally coupled to the battery cooling subsystem (step 921).

Once the battery cooling subsystem is off (steps 905 or 915) and the charging system is operating at the optimal charge rate (steps 907 or 917), then the system controller compares the monitored battery pack SOC with the target SOC (step 923). If the target SOC is greater than the current battery SOC, then the controller compares the battery pack temperature, either the highest monitored temperature or the average temperature as previously noted, to a third preset temperature (step 925). Preferably the third preset temperature is the same as the first preset temperature which, in this embodiment, is 50° C. If the battery temperature is greater than the third preset temperature, e.g., 50° C., then the system loops back in order to start the cooling subsystem (step 909) and reduce the charging rate as necessary (step 911). If the battery temperature is less than the third preset temperature, e.g., 50° C., then the system controller determines if surplus power is available (step 927) based on the current requirements of the charging system and the maximum power available to the system from the external source. If no surplus power is available, the system returns to SOC comparing step 923. If during step 923 the system controller determines that the present SOC is equal to or greater than the target SOC, then the system controller skips steps 925 and 927 and goes directly to step 929.

If surplus power is available as determined in step 927, or if the target SOC has been reached as determined in step 923, then the system controller compares the battery pack temperature to a fourth preset temperature which, in the illustrated embodiment, is 25° C. (step 929). If the battery pack temperature is higher than the fourth preset temperature, e.g., 25° C., then the controller turns on the battery cooling subsystem (step 931). If the battery pack temperature is lower than the fourth preset temperature, then the system compares the current SOC to the target SOC (step 933). If the monitored SOC is equal to or greater than the target SOC as determined in step 933, and if the battery pack temperature is less than the fourth preset temperature as determined in step 929, then the battery charging system is turned off (step 935).

Finally the system enters into a loop in which the current SOC is compared to the target SOC (step 937) and the battery pack temperature is compared to the fourth preset temperature (step 939). As shown in FIG. 9C, this loop ensures that if the current SOC falls below the target SOC, the charging system will charge the battery pack. Similarly, if the battery pack temperature increases beyond the fourth preset temperature, the system turns on the battery pack cooling system.

It will be appreciated that FIGS. 9A-9C simply illustrate a specific embodiment of the invention, and therefore the specifics illustrated in these figures should not be viewed as limiting of the invention. For example, while cell SOC is used throughout the process in order to determine whether or not to continue charging the battery pack, in this embodiment as well as those disclosed above relative to FIGS. 4-7 other battery pack characteristics may be used in making this determination. For example, cell voltage, current, charge Ah, time at constant voltage, or current limit during constant voltage may be used as the monitored battery pack characteristic. Similarly, while specific temperatures are used in determining whether battery pack preconditioning is required and in deciding whether or not continued battery pack cooling is required, these temperatures are merely illustrative of a specific configuration.

Figure 10A:
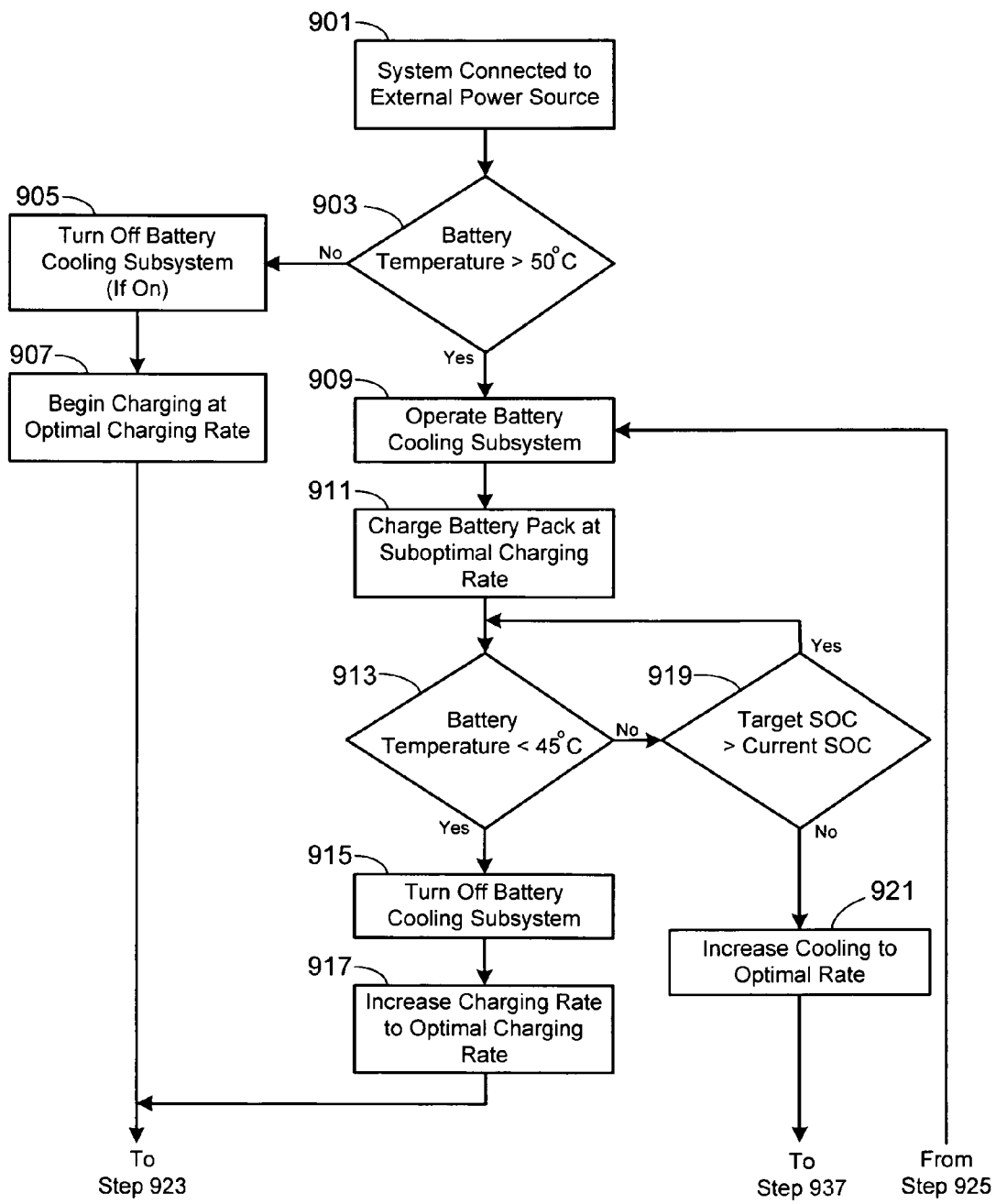
FIG. 10A illustrates the first portion of the methodology of the invention as applied to a variation of the embodiment illustrated in FIGS. 9A-9C.
Figure 10B:
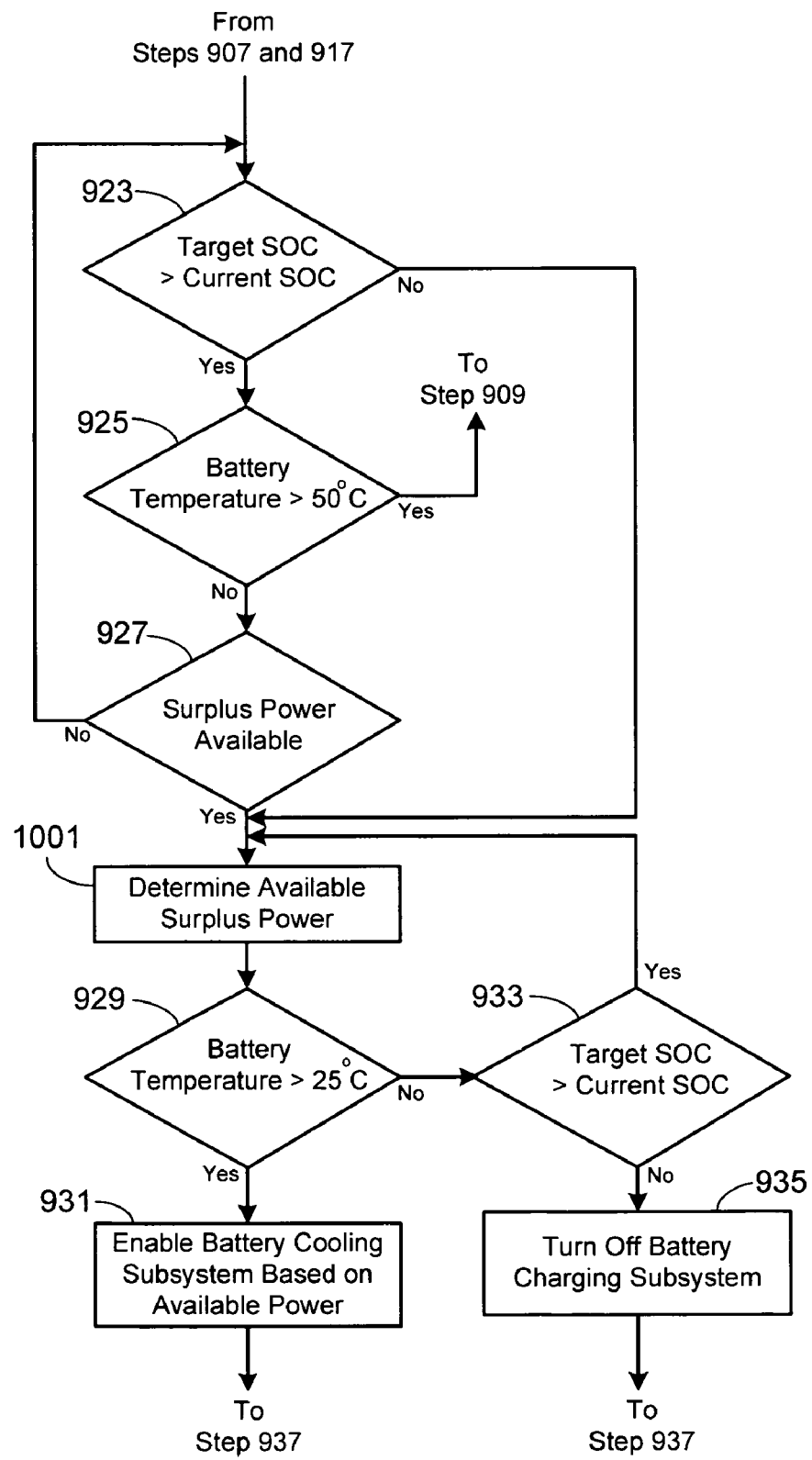
FIG. 10B illustrates the second portion of the methodology of FIG. 10A.
Figure 10C:
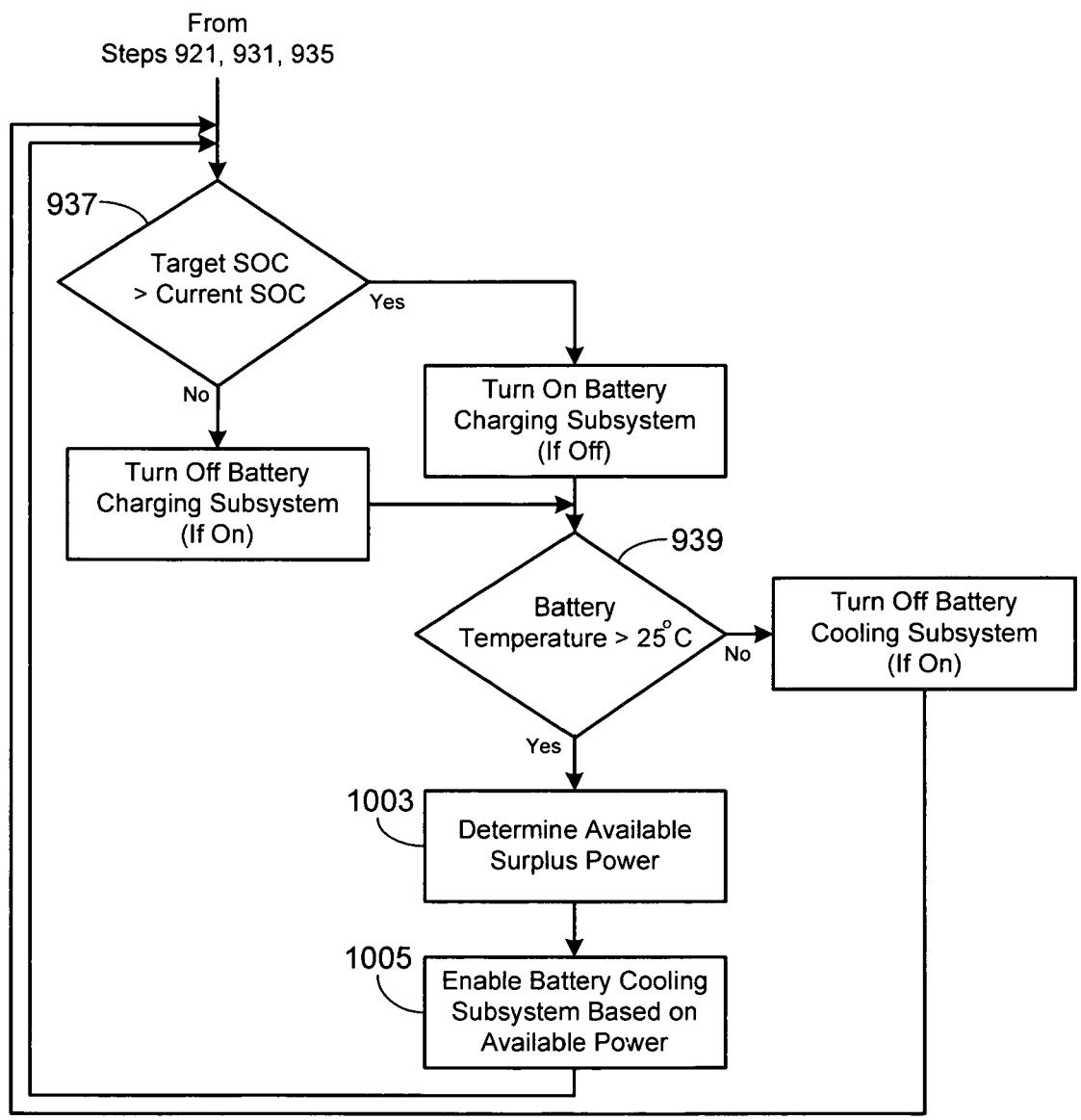
FIG. 10C illustrates the third portion of the methodology of FIGS. 10A and 10B.

In the embodiment described above and illustrated in FIGS. 9A-9C, the assumption is made that the battery cooling subsystem is either "on" or "off". As previously noted relative to FIGS. 4-7, the present invention may be used equally well with a continuously variable system, i.e., where the output of the system as well as the load placed on the external source are variable rather than fixed. For example, FIGS. 10A-10C illustrate a slight modification of the previously described embodiment in which not only is there a step for determining whether or not surplus power is available (step 927), but also a step for determining how much surplus power is available (step 1001). Similarly, if the system determines in step 939 that the temperature of the battery pack is greater than the preset (i.e., 25° C. in this embodiment), then the system determines how much surplus power is available (step 1003) and maximizes cooling to the extent allowed by the available surplus power (step 1005).

Additionally, and as previously noted, preferably if battery charging is terminated before ceasing operation of the auxiliary system (e.g., the battery pack cooling system), then the power required for the auxiliary system is provided by the external power source, for example via the charging system, rather than from the battery pack.

Figure 11:
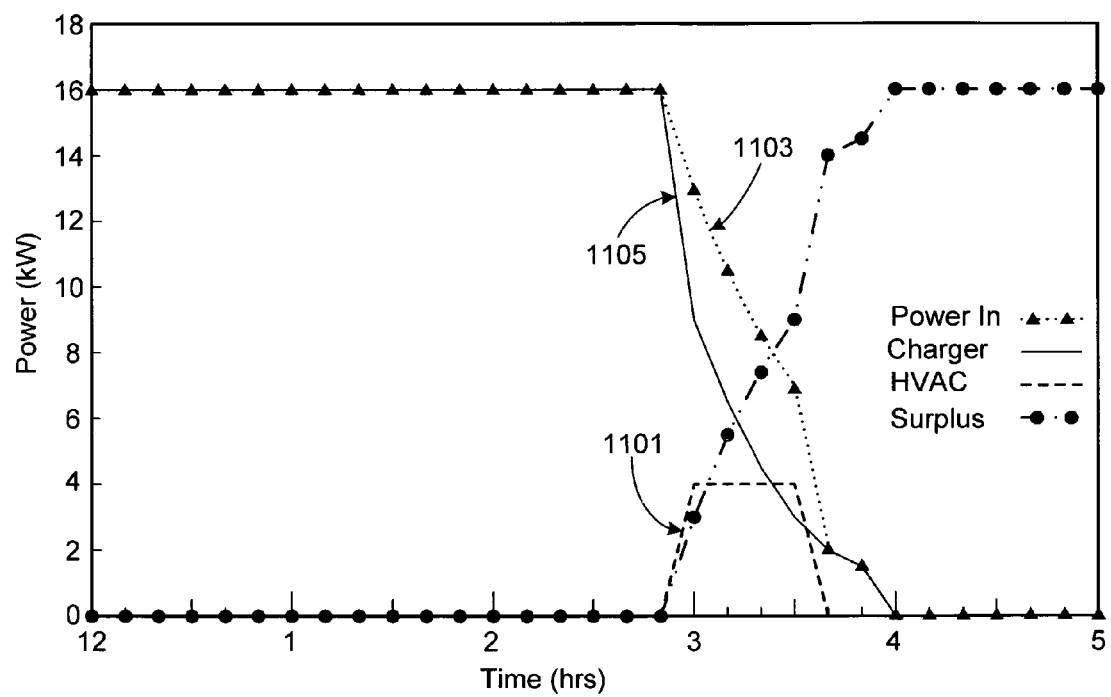
FIG. 11 graphically illustrates the effects of the methodology of the invention on the charging cycle shown in FIG. 1.
Figure 12:
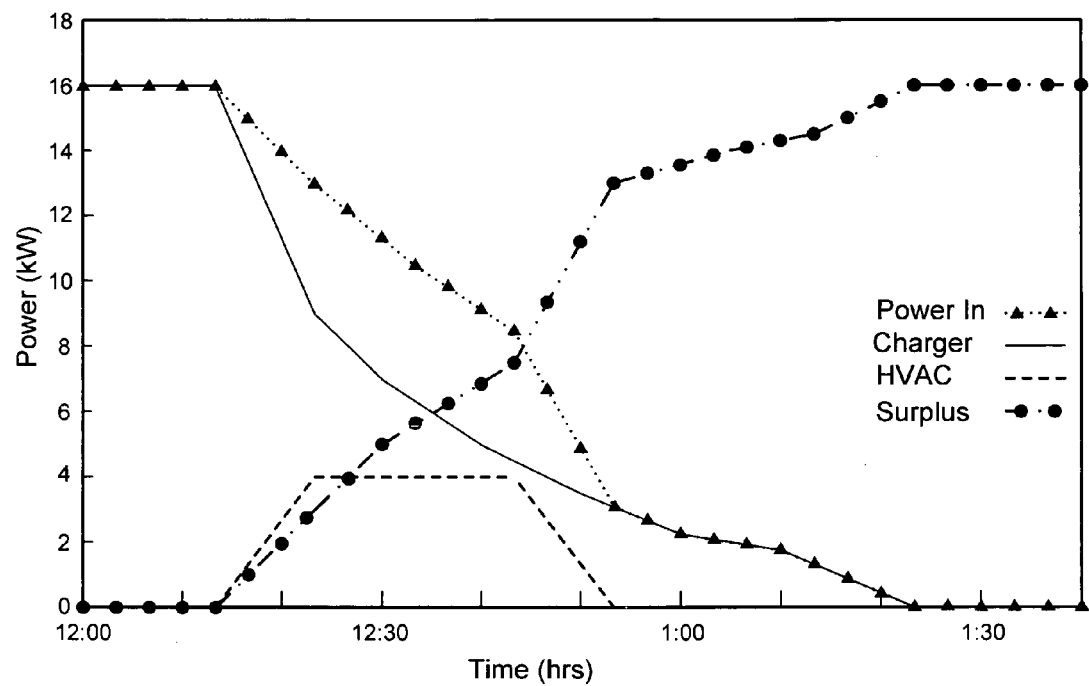
FIG. 12 graphically illustrates the effects of the methodology of the invention on the charging cycle shown in FIG. 2.

FIGS. 11 and 12 illustrate the effects of delaying cooling in accordance with the invention, for example by applying the methodology of FIGS. 9A-9C, on the charging profiles of FIGS. 1 and 2, respectively. As previously noted, in these examples the maximum power is limited to 16 kW. In the profile shown in FIG. 11, cooling (curve 1101) is delayed for almost 3 hours. As a result, all of the power available from the system (curve 1103) can be used for battery charging (curve 1105), rather than having some of the power be supplied to the cooling subsystem during the initial stages of charging as shown in FIG. 1. This same effect is shown in the charging profile illustrated in FIG. 12 where delaying operation of the cooling subsystem allows the charging time of the battery pack to be optimized.

Figure 13A:
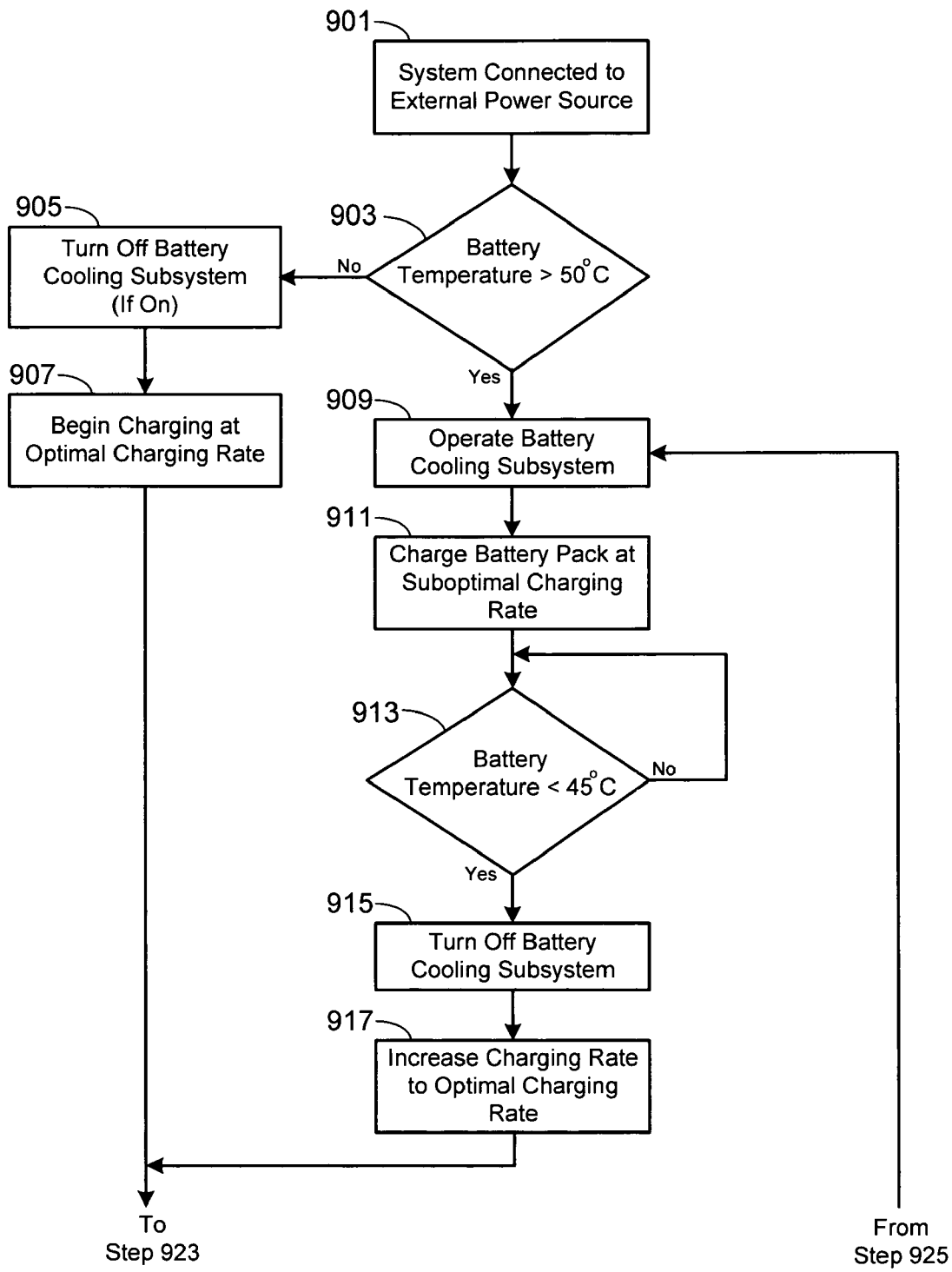
FIG. 13A illustrates the first portion of a variation of the methodology shown in FIGS. 9A-9C.
Figure 13B:
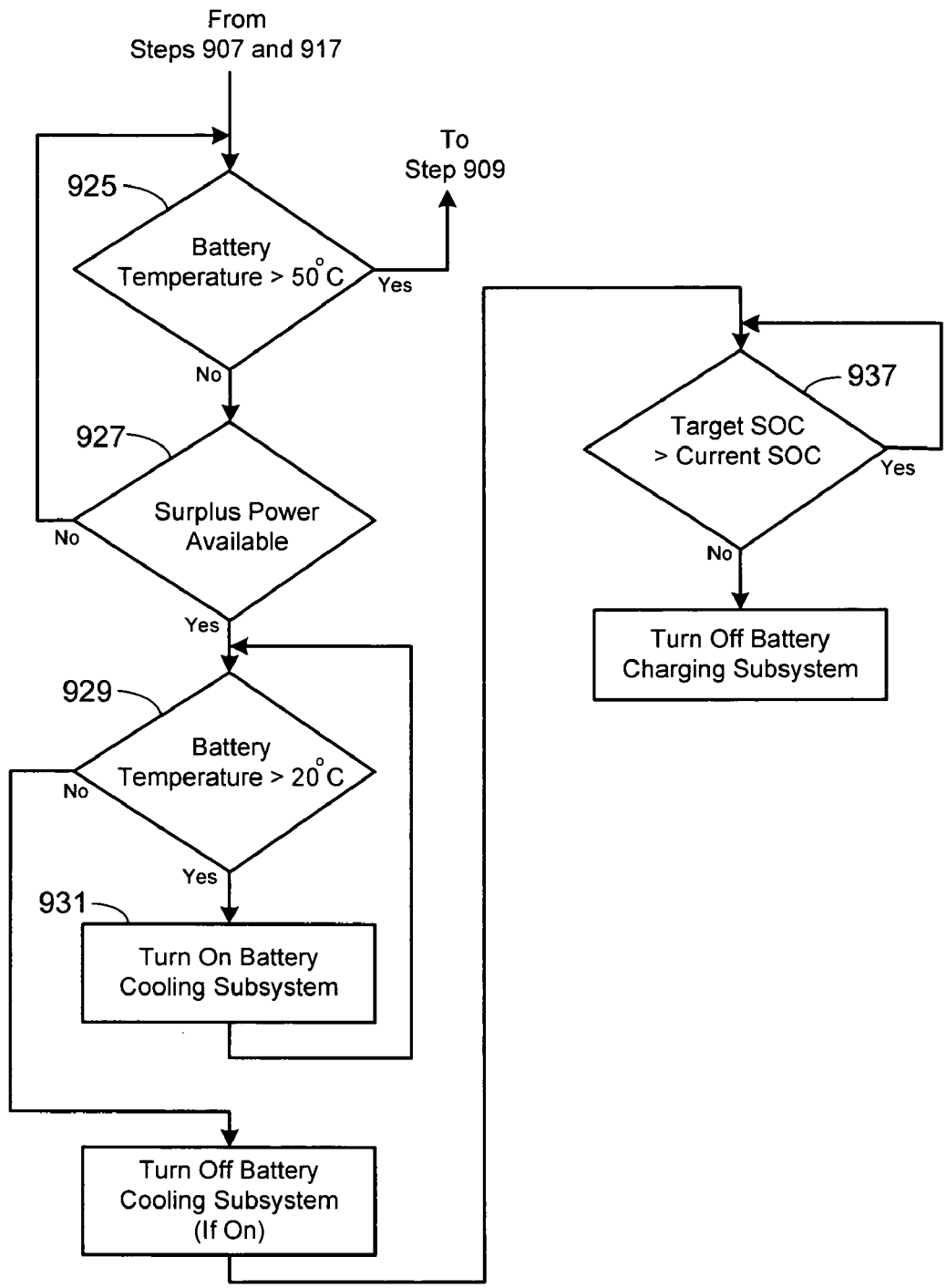
FIG. 13B illustrates the second portion of a variation of the methodology shown in FIGS. 9A-9C.

It will be appreciated that in some applications of the present invention, aspects of the battery pack, the auxiliary load, and/or the overall system allow the charging time optimization system to be simplified. For example, the methodology illustrated in FIGS. 9A-9C may be simplified as shown in FIGS. 13A-13B if the cooling subsystem always cools the battery pack to a temperature below the fourth preset temperature prior to completion of the battery pack charging cycle. The methodology illustrated in FIGS. 13A-13B also assumes that (i) once the battery pack is charged, further charging is not required until the electric vehicle has been driven and the battery at least partially drained; and (ii) once the battery pack is cooled to a temperature below the fourth preset temperature, further cooling is not required until the electric vehicle has been driven.

As will be understood by those familiar with the art, the present invention may be embodied in other specific forms without departing from the spirit or essential characteristics thereof.

What is claimed is:

1. A method for optimizing the charging cycle of a battery pack of an electric vehicle, the method comprising the steps of:

electrically connecting a power control subsystem of said electric vehicle to an external power source, wherein said power control subsystem may draw up to a maximum power from said external power source;

monitoring a battery pack temperature;

comparing said battery pack temperature to a first preset temperature when said power control subsystem is electrically connected to said external power source, said first preset temperature corresponding to a threshold temperature requirement of said battery pack, wherein said method comprises the following steps when said battery pack temperature is greater than said first preset temperature:

enabling operation of a battery pack cooling subsystem; and charging said battery pack at a suboptimal charge rate, wherein said suboptimal charge rate is limited by said maximum power reduced by a power drain corresponding to said battery pack cooling system; and wherein said method comprises the following steps when said battery pack temperature is less than said first preset temperature:

determining an optimal charge rate for said battery pack, wherein said optimal charge rate determining step is performed by a charging controller, and wherein said optimal charge rate is limited by said maximum power;

charging said battery pack at said optimal charge rate;

determining whether surplus power is available from said external power source based on said optimal charge rate;

terminating operation of said battery pack cooling subsystem when said battery pack is charging at said optimal charge rate and when no surplus power is available; and enabling operation of said battery pack cooling subsystem when said battery pack is charging at said optimal charge rate and when surplus power is available.

2. The method of claim 1, wherein said step of enabling operation of a battery pack cooling system when said battery pack temperature is greater than said first preset temperature further comprises the steps of:

comparing said battery pack temperature to a second preset temperature, wherein said second preset temperature is less than said first preset temperature; and terminating operation of said battery pack cooling subsystem when said battery pack temperature is less than said second preset temperature; and adjusting a current charge rate for said battery pack from said suboptimal charge rate to said optimal charge rate when operation of said battery pack cooling subsystem is terminated.

3. The method of claim 1, further comprising the steps of:

comparing said battery pack temperature to a second preset temperature, wherein said second preset temperature is less than said first preset temperature; and enabling operation of said battery pack cooling subsystem when said battery pack temperature is less than said first preset temperature and greater than said second preset temperature, and when said battery pack is charging at said optimal charge rate and when surplus power is available.

4. The method of claim 3, further comprising the step of terminating operation of said battery pack cooling system when said battery pack temperature is less than said second preset temperature.

5. The method of claim 3, further comprising the steps of:

monitoring a battery pack characteristic;

comparing said battery pack characteristic with a target value for said battery pack characteristic; and terminating battery pack charging when said parameter is less than said second preset value and when said battery pack characteristic matches said target value for said battery pack characteristic.

6. The method of claim 3, further comprising the steps of:

monitoring a battery pack state-of-charge (SOC);

comparing said battery pack SOC with a target SOC; and terminating battery pack charging when said battery pack temperature is less than said second preset temperature and when said battery pack SOC is greater than said target SOC.

7. The method of claim 1, further comprising the steps of:

monitoring a battery pack characteristic;

comparing said battery pack characteristic with a target value for said battery pack characteristic; and terminating battery pack charging when said battery pack characteristic matches said target value for said battery pack characteristic.

8. The method of claim 7, further comprising the steps of:

comparing said battery pack temperature to a second preset temperature, wherein said second preset temperature is less than said first preset temperature; and terminating battery pack charging when said battery pack temperature is less than said second preset temperature and when said battery pack characteristic matches said target value for said battery pack characteristic.

9. The method of claim 1, further comprising the steps of:

monitoring a battery pack SOC;

comparing said battery pack SOC with a target SOC; and terminating battery pack charging when said battery pack SOC is greater than said target SOC.

10. The method of claim 9, further comprising the steps of:

comparing said battery pack temperature to a second preset temperature, wherein said second preset temperature is less than said first preset temperature; and terminating battery pack charging when said battery pack temperature is less than said second preset temperature and when said battery pack SOC is greater than said target SOC.

11. The method of claim 1, further comprising the steps of:

monitoring a battery pack characteristic;

periodically comparing battery pack characteristic with a target value for said battery pack characteristic;

terminating battery pack charging when said battery pack characteristic matches said target value for said battery pack characteristic and charging said battery pack at said optimal charge rate when battery pack characteristic is less than said target value for said battery pack characteristic;

periodically comparing said battery pack temperature to a second preset temperature, wherein said second preset temperature is less than said first preset temperature;

enabling operation of said battery pack cooling subsystem when said battery pack temperature is greater than said second preset temperature and surplus power is available; and terminating operation of said battery pack cooling subsystem when said battery pack temperature is less than said second preset temperature.

12. The method of claim 1, further comprising the steps of:

monitoring a battery pack SOC;

periodically comparing said battery pack SOC with a target SOC;

terminating battery pack charging when said battery pack SOC is greater than said target SOC and charging said battery pack at said optimal charge rate when said battery pack SOC is less than said target SOC;

periodically comparing said battery pack temperature to a second preset temperature, wherein said second preset temperature is less than said first preset temperature;

enabling operation of said battery pack cooling subsystem when said battery pack temperature is greater than said second preset temperature and surplus power is available; and terminating operation of said battery pack cooling subsystem when said battery pack temperature is less than said second preset temperature.

13. A method for optimizing the charging cycle of a battery pack of an electric vehicle, the method comprising the steps of:

electrically connecting a power control subsystem of said electric vehicle to an external power source, wherein said power control subsystem may draw up to a maximum power from said external power source;

monitoring a battery pack temperature;

comparing said battery pack temperature to a first preset temperature when said power control subsystem is electrically connected to said external power source, wherein said first preset temperature corresponds to a temperature of at least 50° C., and wherein said method comprises the following steps when said battery pack temperature is greater than said first preset temperature:

enabling operation of a battery pack cooling subsystem;

charging said battery pack at a suboptimal charge rate, wherein said suboptimal charge rate is limited by said maximum power reduced by a power drain corresponding to said battery pack cooling system;

comparing said battery pack temperature to a second preset temperature, wherein said second preset temperature corresponds to a temperature of between 40° C. and 50° C.; and terminating operation of said battery pack cooling subsystem when said battery pack temperature is less than said second preset temperature, and adjusting a current charge rate for said battery pack from said suboptimal charge rate to an optimal charge rate when operation of said battery pack cooling subsystem is terminated; and wherein said method comprises the following steps when said battery pack temperature is less than said first preset temperature:

determining an optimal charge rate for said battery pack, wherein said optimal charge rate determining step is performed by a charging controller, and wherein said optimal charge rate is limited by said maximum power;

charging said battery pack at said optimal charge rate;

determining whether surplus power is available from said external power source based on said optimal charge rate;

terminating operation of said battery pack cooling subsystem when said battery pack is charging at said optimal charge rate and when no surplus power is available; and enabling operation of said battery pack cooling subsystem when said battery pack is charging at said optimal charge rate and when surplus power is available.

14. The method of claim 13, further comprising the steps of:

periodically comparing said battery pack temperature to a third preset temperature, wherein said third preset temperature corresponds to a temperature of less than 30° C.;

enabling operation of said battery pack cooling subsystem when said battery pack temperature is greater than said third preset temperature, said battery pack is charging at said optimal charge rate, and surplus power is available; and terminating operation of said battery pack cooling subsystem when said battery pack temperature is less than said third preset temperature or when surplus power is unavailable.

15. The method of claim 14, further comprising the steps of:

monitoring a battery pack state-of-charge (SOC);

periodically comparing said battery pack SOC with a target SOC; and terminating battery pack charging when said battery pack SOC is greater than said target SOC.

* * * * *

UNITED STATES PATENT AND TRADEMARK OFFICE
CERTIFICATE OF CORRECTION

PATENT NO. : 7,755,329 B2
APPLICATION NO. : 12/590414
DATED : July 13, 2010
INVENTOR(S) : Scott Ira Kohn et al.

It is certified that error appears in the above-identified patent and that said Letters Patent is hereby corrected as shown below:

Title Page item 73
The correct name of the assignee is Tesla Motors, Inc.

Signed and Sealed this

Thirty-first Day of August, 2010

David J. Kappos
*Director of the United States Patent and Trademark Office*